United States Patent Office 3,455,909
Patented July 15, 1969

3,455,909
3-DESOXY STEROIDAL-1,4-DIENE LACTONES AND SPIROETHERS
Theodore J. Foell, King of Prussia, Richard W. Rees, Newton Square, and Herchel Smith, Wayne, Pa., assignors to American Home Products Corporation, New York, N.Y., a corporation of Delaware
No Drawing. Continuation-in-part of application Ser. No. 622,468, Mar. 13, 1967. This application May 29, 1968, Ser. No. 732,811
Int. Cl. C07c *173/00, 169/20*
U.S. Cl. 260—239.55                            6 Claims

ABSTRACT OF THE DISCLOSURE 3-desoxy steroidal-1,4-diene lactones and spiroethers of the 10-alkylgonane series, optionally substituted at $C_1$, $C_2$, $C_4$, and $C_{13}$ with alkyl groups (I) are provided (a) by oxidizing and cyclizing the corresponding 17α-(3-hydroxypropenyl)-,4-diene (II) to form the corresponding propenoic acid lactone (Ic); (b) selectively reducing Compound (Ic) to form a 17α(3-hydroxypropyl-1,4-diene (III); and (c) oxidizing and cyclizing III to form the propanoic acid lactone (Id); or (d) ring-closing Compound (III) to form the corresponding steroidal spiroether (Ie) or, alternatively, preparing Compound (Ie) by selectively cleaving the 3ξ-ol group in the corresponding 3ξ-hydroxy-steroidal spiroether (IV).

Compounds (Id) and (Ie) are aldosterone antagonists, useful to treat hyperaldosteronism. Compounds (Ic) are valuable intermediates.

---

This application is a continuation-in-part of copending application Ser. No. 622,468, filed Mar. 13, 1967, which in turn is a continuation-in-part of copending application application Ser. No. 544,800, filed April 25, 1966.

This invention relates to novel 3-desoxy steroidal-1,4-diene lactones and spiroethers, which are aldosterone antagonists by standard pharmacological procedures in laboratory animals, making them valuable in the control of hyperaldosteronism.

In the above-mentioned copending applications there are disclosed a new class of steroid compounds, the 3-desoxy steroidal-1,4-dienes and means to prepare them. Among the compounds broadly disclosed are 3-desoxy steroidal-1,4-dienes bearing, among others, the lactone group. Furthermore, the above mentioned applications describe and claim the valuable and novel compound androsta-1,4-dien-17-one. It has now been found that androsta-1,4-dien-17-one can be used as the starting material for an exceptionally valuable class of 3-desoxy steroidal 1,4-dienes, including lactone-substituted compounds, and these, in essence, are the subject matter of this invention.

Description of the invention.—The compounds contemplated by this invention are those of Formula I:

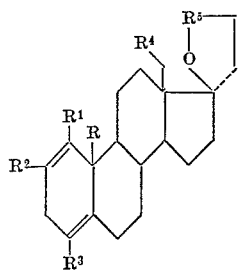

wherein R is (lower)alkyl; $R^1$, $R^2$, $R^3$, and $R^4$ are hydrogen or (lower)alkyl; and $R^5$ is methylene or keto.

Particularly valuable are compounds of Formula I wherein R is methyl; $R^1$, $R^2$ and $R^3$ are hydrogen; $R^4$ is methyl or ethyl; and $R^5$ is methylene or keto.

Special mention is made of several valuable embodiments of this invention. These are:

3-(17β-hydroxy-1,4-androstadien-17α-yl)propanoic acid lactone, a compound of Formula I wherein R and $R^4$ are methyl, $R^1$, and $R^2$ and $R^3$ are hydrogen and $R^5$ is keto, i.e., a compound of Formula Ia:

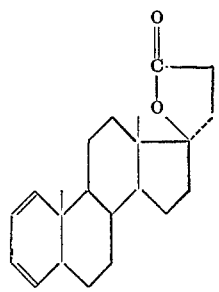

and 2′,3′α-tetrahydrofuran-2′-spiro-17 - (androsta - 1,4-diene), a compound of Formula I wherein R and $R^4$ are methyl, $R^1$, $R^2$ and $R^3$ are hydrogen and $R^5$ is methylene, i.e., a compound of Formula Ib:

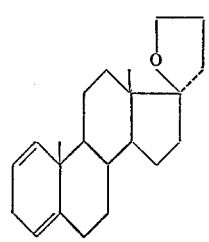

When used herein and in the appended claims the term "(lower)alkyl" contemplates hydrocarbon alkyl radicals, both straight and branched chain, of from about 1 to about 5 carbon atoms, illustrative members of which are methyl, ethyl, n-propyl, i-propyl, n-butyl, t-butyl, n-pentyl and the like.

The new compounds of the present invention can be prepared by a number of methods. One useful pathway comprises (a) Oxidizing and cyclizing as by treatment with chromic acid and sulfuric acid a steroid of Formula II:

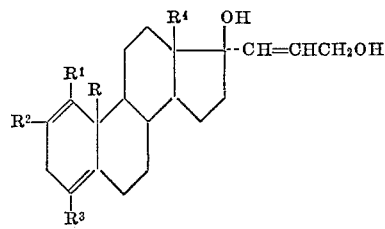

until formation of the corresponding product of Formula Ic:

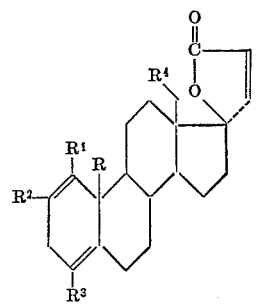

wherein R is (lower)alkyl and $R^1$, $R^2$, $R^3$ and $R^4$ are hydrogen or (lower)alkyl, is substantially complete; and recovering said product;

(b) Selectively reducing as by treatment with an alumino hydride, such as lithium aluminum hydride, said compound of Formula Ic, until formation of a compound of Formula III:

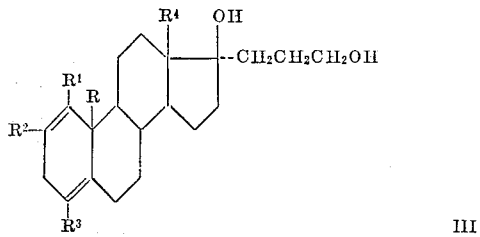

wherein R, $R^1$, $R^2$, $R^3$ and $R^4$ are as above defined, is substantially complete; and (c) Oxidizing then cyclizing as by treatment with chromic acid and sulfuric acid, said compound of Formula III until formation of the corresponding product of Formula Id:

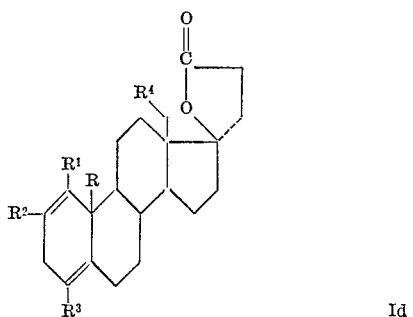

wherein R, $R^1$, $R^2$, $R^3$ and $R^4$ are as above defined, is substantially complete and recovering said product; or (d) Subjecting to ring closure as by treatment with acid, or p-toluenesulfonyl chloride in pyridine, a compound of Formula III until formation of the corresponding spiroether of Formula Ie:

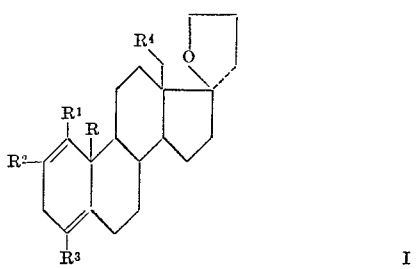

wherein R, $R^1$, $R^2$, $R^3$ and $R^4$ are as above defined, is substantially complete, and recovering said product.

This invention contemplates as intermediates compounds of Formula Ic. Special mention is made of a particular valuable embodiment of this aspect. This is:

3-(17β-hydroxy-1,4-androstadien - 17α - yl)propenoic acid lactone, a compound of Formula I wherein R and $R^4$ are methyl, $R^1$, $R^2$ and $R^3$ are hydrogen, i.e., a compound of Formula If:

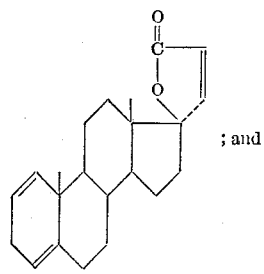; and

Alternatively, the spiroether compounds of Formula Ie of this invention can be prepared by reducing as with an alkali metal, e.g., lithium, or an alkaline earth metal, e.g., calcium, in a liquid amine, e.g., ammonia, preferably in the presence of a carbinol, e.g., 1-methoxy-2-propanol, a 3ξ-hydroxy-steroidal 1,4-diene of Formula IV:

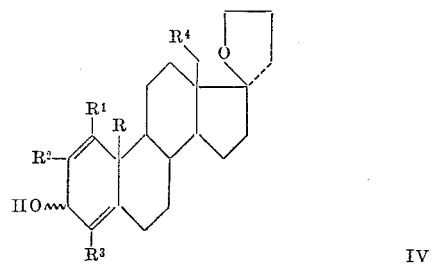

wherein R, $R^1$, $R^2$, $R^3$ and $R^4$ are as hereinabove defined, until conversion of the

group to a methylene group is substantially complete, and recovering the compound of Formula Ie.

The oxidation and cyclization process for converting II to Ic can be carried out at moderate temperatures, e.g., from about −10° C. to about 50° C. and preferably at about 20° C., in an inert medium, such as acetone, employing the reagent, 8 N chromic acid in sulfuric acid, well known to those skilled in the art as the "Jones reagent." The reagent is added dropwise until, at least the stoichiometrical amount has been added, then the mixture is cooled, e.g., to about 0° C. and a lower alkanol, e.g., isopropanol, water and weak base, e.g., sodium bicarbonate, is added to neutralize the mixture. The product is recovered by evaporating the solvents and extracting it into a solvent such as ethyl acetate. After washing and drying the extract, vacuum evaporation of the organic layer provides the compound of Formula Id as a residue.

The selective reduction of the lactone ring double bond in Ic to give III can be carried out for example, by adding to Ic in a solvent, such as tetrahydrofuran, an alumino hydride, e.g., lithium aluminum hydride, portionwise at a moderate temperature, e.g., about 20–40° C., then heating the mixture to reflux, until the reaction is substantially complete; at least about 4 and preferably up to about 20 hours. The intermediate 17α-(3'-hydroxypropyl)compound then is obtained by decomposing the mixture with, for example, ethyl acetate, filtering the mixture and vacuum evaporating the filtrate to an oil. The oil can be oxidized and cyclized with Jones reagent as described for Ic above. III can be purified, if desired by chromatography on neutral alumina from hexanebenzene (elution with benzene) and/or by recrystallization, e.g., from acetone mixed with methanol.

The conversion of III to Ie can be accomplished by allowing a suspension of III and 1 equivalent of p-toluenesulfonyl chloride (or obvious chemical equivalent thereof) in about 20 parts by weight of pyridine to stand at moderate temperature, e.g., from about 15° C. to about 50° C. for from about 4 to about 24 hours. The product Ie can be recovered by diluting the mixture with methylene chloride and filtering. Evaporation of the filtrate, after washing and drying, leaves Ie as a residue.

Alternatively, and preferably, Ie is provided by selective reduction of the 3ξ-ol group in compounds of Formula IV. In one way of proceeding, IV is dissolved in an inert solvent, such as tetrahydrofuran containing about an equal weight of an alcohol, such as 1-methoxy-2-propanol (based on IV). There is then added about 5 volumes of a liquid amine, such as liquid ammonia, and then an alkali metal, such as lithium, is added until an excess is present. If lithium is used, the proper time to stop is when the blue color persists for at least five minutes. The blue color can be discharged with water and more lithium can be added to insure completion of the reaction. The product is recovered by adding ammonium chloride, then water to the mixture and extracting with chloroform. Washing, drying and vacuum evaporating the extract leaves compounds of Formula Ie as a residue. They can be purified, if desired, by chromatography on a suitable adsorbent, e.g., neutral alumina, elution being with hexane or a similar solvent.

Means well known to those skilled in the art can be employed to provide the above-mentioned starting materials. By way of illustration, compounds of Formula II can be obtained from the corresponding 17-ketone by the pathway outlined as follows:

exemplified in detail hereinafter with respect to a particular compound of Formula II.

Compounds of Formula III used as starting materials as outlined above can be prepared from compounds of Formula Ic by selective reduction with an alumino hydride, for example, lithium aluminum hydride, as described above and exemplified hereinafter.

Starting materials of Formula IV, the 3ξ-hydroxy-17-spiroether-substituted steroidal 1,4-dienes can be prepared from the corresponding 17α-(3-hydroxypropyl)gon-5-en-3β,17β-diols of Formula VIII, which may be prepared by means described in Steroids, 8, 877 (1966), and J. Med. Chem., 6, 617 (1963), and by extensions thereof obvious to those skilled in the art, the overall pathway being represented as follows:

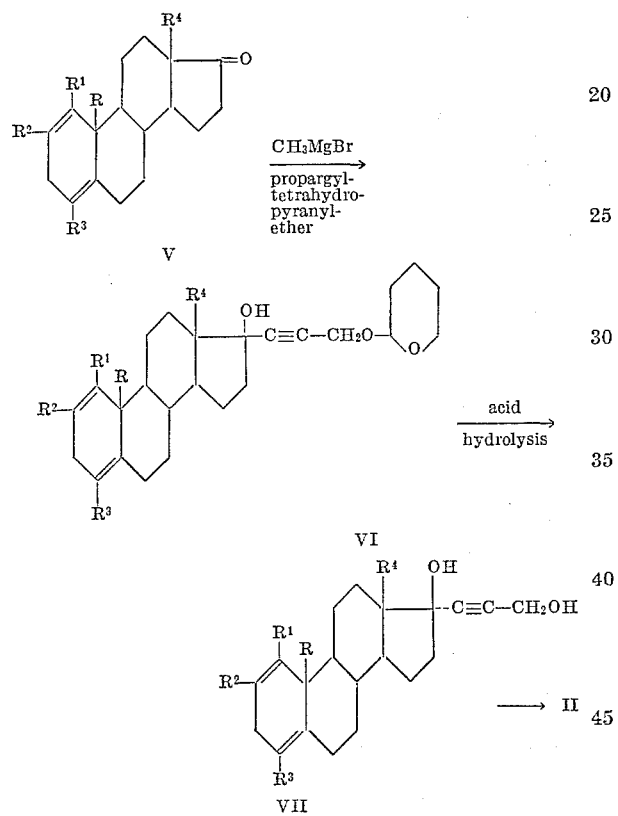

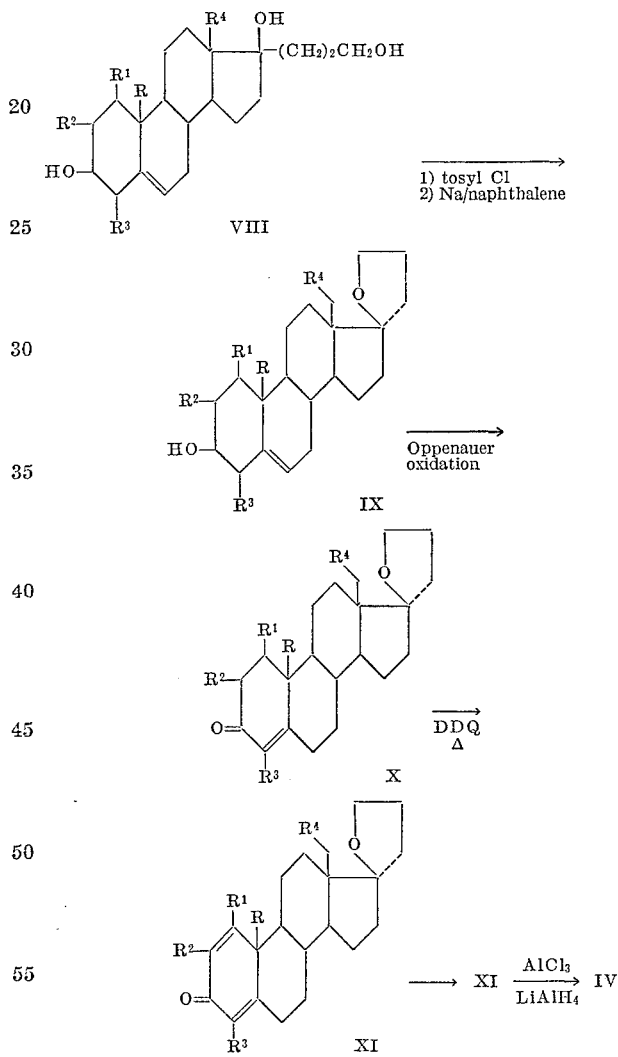

wherein R, R¹, R², R³ and R⁴ are as hereinabove defined. The 17-keto compound V, which may be prepared by means described, for example by applicants in applications Ser. No. 622,468, filed March 13, 1967, and Ser. No. 657,507, filed Aug. 1, 1967, either by selective reductions Ser. No. 622,468, filed Mar. 13, 1967, and Ser. alkali metal in an amine or by hydrogenolysis of the corresponding 3,3-dialkylmercaptol with Raney nickel or an alkali metal in an amine, can be added in tetrahydrofuran solution to a reaction mixture obtained by adding propargyl tetrahydropyranyl ether to methyl magnesium bromide in ether using an equal volume of tetrahydrofuran as diluent and refluxing for 25 hours. Refluxing for about 4 hours and then decomposing the mixture with water provides a suspension of the compound of Formula VI. Evaporation of the solvents to dryness leaves the compound of Formula VI as an oil which is converted by acid hydrolysis (HCl in methanol) to compound of Formula VII. Compounds of Formula VII can be selectively reduced in alcoholic solution at atmospheric pressure with hydrogen in the presence of palladium on a carrier such as calcium carbonate. Removal of the catalyst after the absorption of 1 equivalent of hydrogen and evaporation of the solvent leaves compounds of Formula II as a residue. This general procedure will be wherein R, R¹, R², R³ and R⁴ are as hereinabove defined. In one general manner of proceeding, the 17α-(3-hydroxypropyl)-gon-5-ene-3β,17β-diol of Formula VIII can be suspended in pyridine and after cooling to 0° C., an excess of p-toluenesulfonyl chloride is added. After conversion to the corresponding tosyl ether, this is isolated and treated with sodium and naphthalene in tetrahydrofuran to cleave the partially formed 3-tosyloxy- grouping to the 3-hydroxy grouping, water is added and the product IX is obtained by extraction with a solvent such as ethyl acetate and evaporation to dryness. The compound of Formula IX can be purified by chromatography on alumina. The spiroether 3β-ol can be converted to the spiroether 3-one (X) by oxidation with aluminum isopropylate and cyclohexanone in acetone by a well known procedure (Oppenauer oxidation) which will be illustrated in detail hereinafter. Compounds of Formula X can be converted to the corresponding delta-one-dehydro analogs of Formula XI by refluxing a dioxane solution thereof, mixed with 2,3-dichloro-5,6-dicyano-1,4-benzoquinone (also known as DDQ). Compounds of Formula XI are formed within about four hours and are recovered by cooling the mixture, adding excess methylene chloride, filtering, evaporating the filtrate, extracting the residue with hexane and evaporating the hexane to leave XI as a residue. The conversion of XI to compounds of Formula IV can be accomplished with a mixture obtained by treating aluminum chloride with lithium aluminum hydride in ether. This reagent is added at low temperature, e.g., $-15°$ C. to a suspension of XI in a medium such as a mixture of diethyl ether and tetrahydrofuran. After the reaction is complete, at least about one hour, ethyl acetate can be added to decompose the excess reagent. The product is recovered by adding saturated sodium sulfate solution to gel the precipitate, filtering off the supernatant and evaporating it to leave the compound of Formula IV as a residue. These techniques will be illustrated in detail hereinafter.

Methods for the total synthesis of many of the precursors for all of the steroids of this application are provided by Douglas, Graves, Hartley, Hughes, McLoughlin, Siddall and Smith in J. Chem. Soc., 1963, 5072–5094; and by H. Smith, Hughes, Douglas, Wendt, Buzby, Jr., Edgren, Fisher, Foell, Gadsby, Hartley, Herbst, Jansen, Ledig, McLoughlin, McMenamin, Pattison, Phillips. Rees, Siddall, Suida, L. Smith, Tokolics and Watson in J. Chem. Soc., 1964, 4472–4492. These are especially useful for compounds in which $R^4$ is polycarbon alkyl and, combined with other well known means such as, for example, the procedures of R. Rees, D. P. Strike and H. Smith, J. Med. Chem., 10, 783 (1967), and D. P. Strike, D. Herbst and H. Smith, J. Med. Chem., 10, 446 (1967), can provide appropriate R, $R^1$, $R^2$ and $R^3$ substituents, as well.

The time and temperature ranges used in carrying out the above mentioned processes are not particularly critical, and, as will be readily apparent to those skilled in the art, will be selected to carry out the reaction in a minimum of time without undue difficulty. Thus, reaction temperatures below those exemplified can be used, but then the reaction time is extended. On the other hand, reaction temperatures higher than those exemplified can be used with a concomitant decrease in reaction time, although purity of the product may be decreased.

In the product of a total synthesis which has not included a suitable resolution stage the compounds of the invention will be present as racemates. Using a convention approved by Fieser and Fieser, "Steroids," p. 336 (1959), the compounds designated as the d-forms are the enantiomers corresponding in configuration at C–13 to that of the natural hormone estrone. The corresponding enantiomorphs are consequently designated the l-forms and the racemates the dl-forms. Racemates will be depicted by structural formulas which show only the enantiomorphs of the d-configuration.

As is mentioned hereinabove, the compounds of Formula I of this invention have anti-aldosterone activity. This makes them useful to treat conditions in animals, such as valuable domestic animals, and in laboratory animals, such as rats, mice and the like, responsive to treatment with anti-aldosterone agents, such as the need to counteract hyperaldosteronism and to overcome edemae, minimize sodium retention and aid in the retention of potassium.

The products of Formula I of this invention can be used in association with a non-toxic carrier. They can be formulated in liquid or solid forms, for instance as capsules, tablets, suppositories, powders, dispersible granules, cachets, and the like by combining them with conventional carriers. Such conventional carriers include magnesium carbonate or stearate, talc, sugar, lactose, pectin, dextrin, starch, gelatin, tragacanth, methyl cellulose, sodium carboxymethyl cellulose, low melting wax and cocoa butter. Diluents, flavoring agents, solubilizers, lubricants suspending agents, binders or tablet-disintegrating agents can be used. Powders or tablets preferably contain 5 or 10 to 99% of the active constituent. The active steroid can be formulated with an encapsulating material with or without other carriers.

Liquid preparations such as solutions, suspensions or emulsions can also be used. Such preparations include dispersions in a non-toxic carrier such as arachis oil or sterile water, preferably containing a nonionic surface active agent such as fatty acid esters of polyhydroxy compounds, e.g., sorbitan, aqueous starch in sodium carboxymethyl cellulose solutions, aqueous propylene glycol or polyethylene glycol. Thus a water-propylene glycol solution can be used for parenteral injection and aqueous suspensions suitable for oral use can be made by utilizing natural or synthetic gums, resins, methyl cellulose or other well known suspending agents.

The composition can be in unit dose form in which the dose unit is for instance from about 0.1 to about 200 mg. of each active steroid. The unit dose form can be a packaged composition, e.g., packeted powder, vials, or ampules or, for example, in the form of capsules, cachets or tablets or any number of these in packaged form. The pharmaceutical compositions can also consist substantially solely of the active steroid when this is in unit dose form. When used for the purposes stated above, the dosage of the compounds will vary with the conditions being treated, but in general will be in the range established for spironolactone (The Merck Manual, eleventh edition, p. 1581 (1966)).

Description of the preferred embodiments.—The following examples illustrate the preparation of many of the products of this invention. They are merely illustrative and are not to be construed to limit the scope of the invention in any manner whatsoever. The terms "Jones reagent" and "DDQ" refer to 8 N chromic acid in sulfuric acid and 2,3-dichloro-5,6-dicyano-1,4-benzoquinone, respectively.

EXAMPLE 1

3-(17β-hydroxy-1,4-androstadien-17α-yl)propanoic acid lactone

Added portionwise to 3.01 g. of 3-(17β-hydroxy-1,4-androstadien-17α-yl)propenoic acid lactone (Example 2) dissolved in tetrahydrofuran (100 ml.) is lithium aluminum hydride (6.02 g.), then the mixture is refluxed overnight (17 hours). The reaction mixture is cooled in ice-water and ethyl acetate is added dropwise, then water is added and the mixture is filtered. The residue and the filtrate are extracted with ethyl acetate, washed with water, dried over sodium sulfate and vacuum evaporated to an oil. The oil is oxidized with Jones reagent (4.2 ml.), under nitrogen at 20° C. Isopropanol is added to the reaction mixture followed by aqueous sodium bicarbonate, then the mixture is extracted with ethyl acetate. Vacuum evaporation produces an oil which is placed on a 60 g. neutral alumina column (1:1 hexane-benzene) elution with benzene produces the product which is recrystallized from acetone-methanol yielding 722 mg., M.P. 131–134° C.;

$\lambda_{max}^{KBr}$ 3.48, 3.55, 5.62μ etc.

*Analysis.*—Calcd. for $C_{22}H_{30}O_2 \cdot \frac{1}{3} CH_3OH$: C, 80.93; H, 9.26. Found: C, 80.13; H, 9.27.

EXAMPLE 2

3-(17β-hydroxy-1,4-androstadien-17α-yl)-propanoic acid lactone (a) 17β-hydroxy - 17α-(3'-hydroxyprop - 1'-yn-1'-yl)-1,4-androstadiene.—Add to methyl magnesium bromide (65 ml. of 3 molar in ether) under nitrogen, is propargyl tetrahydropyranyl ether (33.1 g.) in tetrahydrofuran (26 ml.) and reflux for 2.5 hours. Add to the reaction mixture a solution of 1,4-androstadien-17-one (17.5 g.) in tetrahydrofuran (98 ml.) and reflux for 4 hours. The reaction mixture is cooled to room temperature and water is added dropwise, then the mixture is washed with 5% sulfuric acid, water, dried over sodium sulfate, then evaporated to an oil. The oil is hydrolyzed by adding methanol (150 ml.) concentrated hydrochloric acid (25 ml.) and the mixture is stirred under nitrogen for 5.5 hours. The reaction mixture is neutralized by adding solid sodium bicarbonate and water. The product is extracted with chloroform, washed with water, dried over sodium sulfate and vacuum evaporated. The solid product is obtained (16.2 g.) by recrystallizing from 1:1 ethyl acetate-hexane.

(b) 17β-hydroxy - 17α-(3'-hydroxyprop - 1'-en-1'-yl)-1,4-androstadiene.—17β-hydroxy - 17α-(3'-hydroxyprop-1'-yn-1'-yl)-1,4-androstadiene (14 g.) is dissolved in 100 ml. of methanol and placed on a shaker under hydrogen at atmospheric pressure in the presence of 1.68 g. of 3% palladium on calcium carbonate until one equivalent is absorbed. The catalyst is filtered off and the solvent is removed by vacuum evaporation. The product (9.06 g.) is purified by recrystallization of the residue in ethyl acetate.

(c) 3-17β-hydroxy-1,4-androstadien-17α-yl)propenoic acid lactone.—Jones reagent (12.78 ml.) is added dropwise to a solution of 17β-hydroxy-17α(3'-hydroxyprop-1'-en-1'-yl)-1,4-androstadiene (9.0 g.) dissolved in 150 ml. of acetone at 20° C. The reaction mixture is cooled and isopropanol, water, and sodium bicarbonate are successively added. The solvent is removed by vacuum evaporation. The residue is taken up in ethyl acetate, washed with water and dried over sodium sulfate. Vacuum evaporation produces the product (4.5 g.) M.P. 145 . . . 160–165° C.;

$\lambda_{max.}^{KBr}$ 3.42, 3.50, 5.65μ etc. (ε 210 10,890)

Analysis.—Calcd. for $C_{22}H_{28}O_2$: C, 81.44; H, 8.70. Found: C, 81.13; H, 8.47.

EXAMPLE 3

2',3'α-tetrahydrofuran-2'-spiro-17-(androsta-1,4-diene)

(a) 2',3'α-tetrahydrofuran-2'-spiro - 17-(5-androsten-3β-ol).—Add to 17α-(3-hydroxypropyl) - 5-androstene-3β,17β-diol (25 g.) slurry in 160 ml. of pyridine and cool to 0° C., 37.5 g. of p-toluenesulfonyl chloride in 90 ml. of pyridine. Continue stirring for 1.5 hours at 0° C. The cooling bath is removed and stirring is continued at room temperature (22° C.) for 17 hours. The reaction mixture is filtered, extracted with chloroform, washed with water, dried over sodium sulfate, and vacuum evaporated to give 32.5 g. of an oil.

Sodium (6.84 g.) is added to a solution of naphthalene (41.0 g.) in 990 ml. THF under nitrogen and the mixture is stirred for 3 hours. The oil (31.5 g.) from above is added and stirred until disappearance of the intense green color. The reaction mixture is filtered to remove any excess sodium, water (20 ml.) is added to the filtrate, then the mixture is vacuum evaporated to ca. 300 ml. More water is added then the mixture is extracted with ethyl acetate. The extract is vacuum evaporated to a solid which is placed on 0.7 kg. of neutral alumina in benzene. Elution with benzene removes the naphthalene, further elution with 10% to 40% ethyl acetate in benzene elutes the product in a 9.02 g. yield, M.P. 191.5–192° C.

(b) 2',3'α-tetrahydrofuran - 2' - spiro - 17 - (4-androsten-3-one).—2',3'α-tetrahydrofuran - 2'-spiro - 17-(5-androstene-3β-ol) (9.0 g.) is dissolved, under nitrogen, in a boiling solution of toluene (225 ml.) and cyclohexanone (72 ml.). Forty-five ml. of toluene are removed by distillation to insure dryness, then aluminum isopropylate (4.5 g.) in toluene (45 ml.) is added and the reaction mixture is refluxed for 20 minutes. The reaction mixture is cooled to 95° C., water (45 ml.) is added, the mixture is cooled to room temperature, then 315 ml. of 6 N sulfuric acid is added. The layers are separated, washed and each back extracted. The combined organic extracts are exhaustively steam distilled. Vacuum evaporation produces an oil which is chromatographed on 250 g. of alumina in hexane and eluted with increasing concentration of ethyl acetate yielding 5.03 g. of the product, M.P., 87–89° C.

(c) 2',3'α-tetrahydrofuran-2'-spiro-17 - (1,4 - androstadien-3-one).—2',3'α-tetrahydrofuran-2'-spiro-17 - (4 - androsten-3-one) (5.03 g.) and 3.9 g. of DDQ are refluxed in dioxane (30 ml.), under nitrogen, for 4 hours. The reaction mixture is cooled, methylene chloride is added and the mixture filtered. The filtrate is evaporated to an oil which is extracted with hexane which then is evaporated to yield in various crops 2.0 g. of the product.

(d) 2',3'α-tetrahydrofuran-2'-spiro - 17 - (androsta-1,4-diene).—Aluminum chloride (1.2 g.) is added to a stirred suspension of lithium aluminum hydride (1.14 g.) in 100 ml. of ether at 0° C. The mixture is stirred for 1 hour, filtered through glass wool and added over one hour to a solution of 2',3'α-tetrahydrofuran-2'-spiro-17-(1,4-androstadien-3-one) (2.0 g.) in 100 ml. ether and 25 ml. THF at −15° C. The stirring is continued for one hour, 25 ml. of ethyl acetate is added dropwise; then the mixture is stirred for ½ hour allowing the reaction mixture to warm up to room temperature. A saturated solution of sodium sulfate is added until the resulting precipitate gels and adheres to the side of the flask. The supernatant is removed by filtration, the gel washed with ethyl acetate and added to the filtrate. Vacuum evaporation produces an oil, which is the 3ξ-hydroxy steroidal 1,4-diene.

The oil is dissolved in THF (90 ml.) containing 1-methoxy-2-propanol (2.0 ml.) and added with stirring to 475 ml. of distilled liquid ammonia. Lithium is added piecemeal until the blue color persists for five minutes. The blue color is discharged with the addition of water. More lithium is added until the blue color persists for five minutes. The blue color is discharged by the addition of solid ammonium chloride, water is added, and extracted with chloroform. The extract is washed with water, dried over sodium sulfate, and vacuum evaporated to an oil. The oil is placed on a 40 g. neutral alumina column and eluted with hexane giving in three crops 301.7 mg. of the product, M.P. 70–77° C.;

$\lambda_{max.}^{KBr}$ 3.48, 3.57μ etc.

Analysis.—Calcd. for $C_{22}H_{32}O$: C, 84.56; H, 10.32. Found: C, 84.59; H, 10.54.

EXAMPLE 4

The procedure of Example 1 is repeated, substituting for the 3-(17β-hydroxy-1,4-androsta-dien-17α-yl)propenoic acid lactone stoichiometrical amounts of the following steroidal propenoic acid lactones:

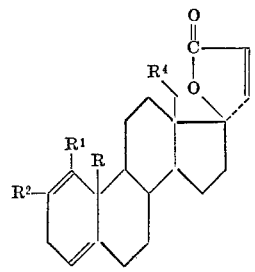

| R | R¹ | R² | R³ | R⁴ |
|---|---|---|---|---|
| CH₃ | CH₃ | H | H | CH₃ |
| CH₃ | H | H | H | H |
| CH₃ | H | H | H | CH₃CH₂ |
| CH₃CH₂ | H | H | H | CH₃ |
| CH₃ | H | CH₃ | H | CH₃ |
| CH₃ | H | H | CH₃ | CH₃ |
| CH₃ | H | H | H | CH₃(CH₂)₄CH₂ |

11

There are obtained the following steroidal propanoic acid lactones:

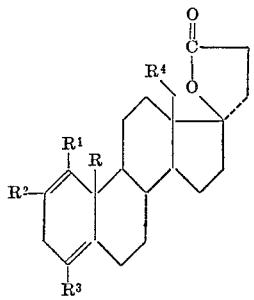

| R | R¹ | R² | R³ | R⁴ |
|---|----|----|----|----|
| CH₃ | CH₃ | H | H | CH₃ |
| CH₃ | H | H | H | H |
| CH₃ | H | H | H | CH₃CH₂ |
| CH₃CH₂ | H | H | H | CH₃ |
| CH₃ | H | CH₃ | H | CH₃ |
| CH₃ | H | H | CH₃ | CH₃ |
| CH₃ | H | H | H | CH₃(CH₂)₄CH₂ |

EXAMPLE 5

The procedure of Example 2 is repeated, substituting for the 1,4-androstadien-17-one, stoichiometrical amounts of the following steroidal 17-ones:

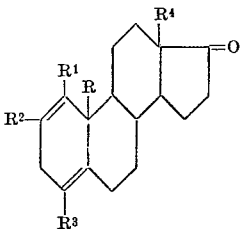

| R | R¹ | R² | R³ | R⁴ |
|---|----|----|----|----|
| CH₃ | CH₃ | H | H | CH₃ |
| CH₃ | H | H | H | H |
| CH₃ | H | H | H | CH₃CH₂ |
| CH₃CH₂ | H | H | H | CH₃ |
| CH₃ | H | CH₃ | H | CH₃ |
| CH₃ | H | H | CH₃ | CH₃ |
| CH₃ | H | H | H | CH₃(CH₂)₄CH₂ |

After completing steps (a), (b) and (c), there are obtained the following steroidal propenoic acid lactones:

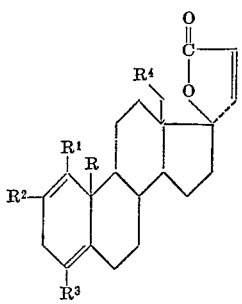

| R | R¹ | R² | R³ | R⁴ |
|---|----|----|----|----|
| CH₃ | CH₃ | H | H | CH₃ |
| CH₃ | H | H | H | H |
| CH₃ | H | H | H | CH₃CH₂ |
| CH₃CH₂ | H | H | H | CH₃ |
| CH₃ | H | CH₃ | H | CH₃ |
| CH₃ | H | H | CH₃ | CH₃ |
| CH₃ | H | H | H | CH₃(CH₂)₄CH₂ |

12

EXAMPLE 6

The procedure of Example 3 is repeated, substituting for the 17α-(3-hydroxypropyl)-5-androstene-3β,17β-diol, stoichiometrical amounts of the following steroids:

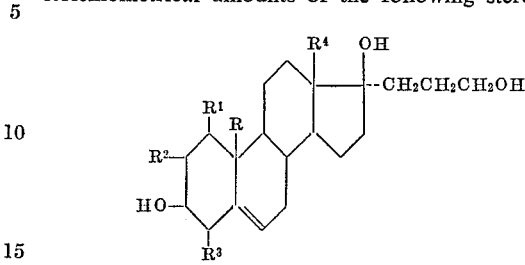

| R | R¹ | R² | R³ | R⁴ |
|---|----|----|----|----|
| CH₃ | CH₃ | H | H | CH₃ |
| CH₃ | H | H | H | H |
| CH₃ | H | H | H | CH₃CH₂ |
| CH₃CH₂ | H | H | H | CH₃ |
| CH₃ | H | CH₃ | H | CH₃ |
| CH₃ | H | H | CH₃ | CH₃ |
| CH₃ | H | H | H | CH₃(CH₂)₄CH₂ |

There are obtained after completion of steps (a)–(d) the following steroidal spiro ethers:

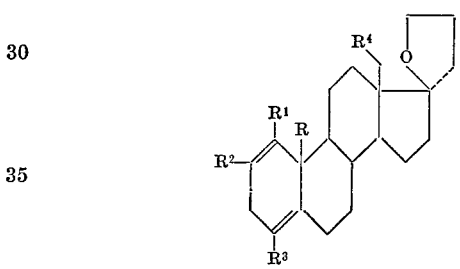

| R | R¹ | R² | R³ | R⁴ |
|---|----|----|----|----|
| CH₃ | CH₃ | H | H | CH₃ |
| CH₃ | H | H | H | H |
| CH₃ | H | H | H | CH₃CH₂ |
| CH₃CH₂ | H | H | H | CH₃ |
| CH₃ | H | CH₃ | H | CH₃ |
| CH₃ | H | H | CH₃ | CH₃ |
| CH₃ | H | H | H | CH₃(CH₂)₄CH₂ |

What is claimed is:
1. A compound of the formula:

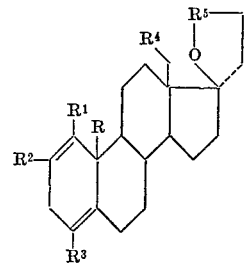

wherein
R is (lower)-alkyl;
R¹, R², R³, and R⁴ are hydrogen or (lower)alkyl; and
R⁵ is methylene or keto.
2. A compound as defined in claim 1 wherein
R is methyl;
R¹, R² and R³ are hydrogen;
R⁴ is methyl or ethyl; and
R⁵ is methylene or keto.
3. 3 - (17β-hydroxy-1,4-androstadien-17α-yl)propanoic acid lactone.
4. 2′,3′α - tetrahydrofuran-2′-spiro-17-(androsta-1,4-diene).

5. A compound of the formula:
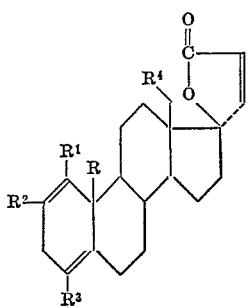
wherein
R is (lower)alkyl; and
$R^1$, $R^2$, $R^3$ and $R^4$ are hydrogen or (lower)alkyl.
6. 3 - (17β-hydroxy-1,4-androstadien-17α-yl)propenoic acid lactone.
References Cited
Crabbe et al. Journ. Med. Chem., vol. 6, 1963, pp. 182–184.
LEWIS GOTTS, primary Examiner
E. G. LOVE, Assistant Examiner
U.S. Cl. X.R.
260—239.57, 397.3, 397.5, 999

PO-1050
(5/69)

UNITED STATES PATENT OFFICE
CERTIFICATE OF CORRECTION

Patent No. 3,455,909    Dated July 15, 1969

Inventor(s)  Theodore J. Foell, Richard W. Rees & Herchel Smith

It is certified that error appears in the above-identified patent and that said Letters Patent are hereby corrected as shown below:

Column 1, lines 57-69; Column 2, lines 60-72; Column 3, lines 24-36; lines 44-54; Column 4, lines 6-18; Column 6, lines 26-59; Column 10, lines 55-68; Column 11, lines 3-16; 54-68; Column 12, lines 27-40; 51-63; and Column 13, lines 2-15, each occurrence, that portion of the formulae reading

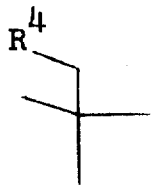    should read    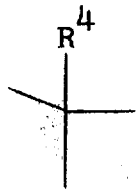

Column 3, line 54, the reference numeral "I" should read --Ie--.

SIGNED AND
SEALED
APR 14 1970

(SEAL)
Attest:

Edward M. Fletcher, Jr.
Attesting Officer

WILLIAM E. SCHUYLER, JR.
Commissioner of Patents